United States Patent
Regev (10) Patent No.: US 9,736,804 B2
(45) Date of Patent: Aug. 15, 2017

(54) METHODS, SYSTEMS, AND COMPUTER READABLE MEDIA FOR SYNCHRONIZING TIMING AMONG NETWORK INTERFACE CARDS (NICS) IN A NETWORK EQUIPMENT TEST DEVICE

(71) Applicant: Ixia, Calabasas, CA (US)

(72) Inventor: Alon Regev, Woodland Hills, CA (US)

(73) Assignee: Ixia, Calabasas, CA (US)

( * ) Notice: Subject to any disclaimer, the term of this patent is extended or adjusted under 35 U.S.C. 154(b) by 37 days.

(21) Appl. No.: 14/688,630

(22) Filed: Apr. 16, 2015

(65) Prior Publication Data

US 2016/0309434 A1    Oct. 20, 2016

(51) Int. Cl.
*H04W 56/00* (2009.01)
*H04L 12/26* (2006.01)

(52) U.S. Cl.
CPC ....... *H04W 56/0015* (2013.01); *H04L 43/106* (2013.01)

(58) Field of Classification Search
CPC .................. H04W 56/0015; H04L 43/106
See application file for complete search history.

(56) References Cited

U.S. PATENT DOCUMENTS

| | | | |
|---|---|---|---|
| 6,868,069 B2 | 3/2005 | Knobbe et al. | |
| 7,092,586 B2 | 8/2006 | Vokey et al. | |
| 7,881,209 B2 | 2/2011 | Beliles, Jr. et al. | |
| 8,718,482 B1 | 5/2014 | Roberts | |
| 8,767,565 B2 | 7/2014 | Dalmau et al. | |
| 9,130,945 B2 | 9/2015 | Smith et al. | |
| 9,380,070 B1 | 6/2016 | Cain et al. | |
| 2003/0105976 A1 | 6/2003 | Copeland, III | |
| 2004/0190547 A1 | 9/2004 | Gordy et al. | |
| 2007/0268938 A1 | 11/2007 | Dowd | |
| 2009/0231191 A1* | 9/2009 | Wu ........................ | G04G 7/00 342/357.395 |

(Continued)

FOREIGN PATENT DOCUMENTS

WO    WO 2011/144263 A1    11/2011
WO    WO 2016/168064 A1    10/2016

OTHER PUBLICATIONS

Commonly-assigned, co-pending U.S. Appl. No. 14/688,644 for "Methods, Systems, and Computer Readable Media for Emulating Network Devices with Different Clocks," (Unpublished, filed Apr. 16, 2015).

(Continued)

*Primary Examiner* — Mohammad Anwar
(74) *Attorney, Agent, or Firm* — Jenkins, Wilson, Taylor & Hunt, P.A.

(57) ABSTRACT

Methods, systems, and computer readable media for synchronizing timing among network interface cards in a network equipment test device are disclosed. One method includes generating and sending timing synchronization measurement signals to the management network interface card and a test network interface card in the network equipment test device. The method further includes recording times of receipt of the timing synchronization measurement signals at the management network interface card and the test network interface card. The method further includes adjusting timing of the test network interface card using the times of receipt of the timing synchronization measurement signals.

21 Claims, 7 Drawing Sheets

(56) References Cited

U.S. PATENT DOCUMENTS

| | | | |
|---|---|---|---|
| 2011/0170534 A1* | 7/2011 | York | H04J 3/0667 370/350 |
| 2011/0199133 A1 | 8/2011 | Yamada | |
| 2011/0211473 A1 | 9/2011 | Matityahu et al. | |
| 2011/0268097 A1 | 11/2011 | Agrawala et al. | |
| 2012/0166327 A1 | 6/2012 | Amicangioli | |
| 2012/0275317 A1 | 11/2012 | Geva | |
| 2013/0080817 A1 | 3/2013 | Mihelic | |
| 2013/0094515 A1 | 4/2013 | Gura et al. | |
| 2013/0173778 A1 | 7/2013 | Hsy et al. | |
| 2013/0212439 A1 | 8/2013 | Stevens et al. | |
| 2013/0259049 A1 | 10/2013 | Mizrahi | |
| 2013/0265886 A1 | 10/2013 | Leong | |
| 2013/0278312 A1 | 10/2013 | Getzin et al. | |
| 2013/0329595 A1 | 12/2013 | Scholz | |
| 2013/0343207 A1 | 12/2013 | Cook et al. | |
| 2013/0347103 A1 | 12/2013 | Veteikis et al. | |
| 2014/0006610 A1 | 1/2014 | Formby et al. | |
| 2014/0185632 A1 | 7/2014 | Steiner et al. | |
| 2014/0297852 A1 | 10/2014 | Shimizu et al. | |
| 2014/0317288 A1 | 10/2014 | Krueger et al. | |
| 2014/0321285 A1 | 10/2014 | Chew et al. | |
| 2014/0344930 A1 | 11/2014 | Foley | |
| 2015/0016274 A1 | 1/2015 | Holland | |
| 2015/0023168 A1 | 1/2015 | Kotecha et al. | |
| 2015/0023170 A1 | 1/2015 | Kakadia et al. | |
| 2015/0281025 A1 | 10/2015 | Wallbaum et al. | |
| 2016/0065434 A1 | 3/2016 | Janakiraman | |
| 2016/0110211 A1 | 4/2016 | Karnes | |
| 2016/0285575 A1 | 9/2016 | Holmeide | |
| 2016/0301589 A1 | 10/2016 | Rata et al. | |
| 2016/0301599 A1 | 10/2016 | Porfiri et al. | |
| 2016/0306726 A1 | 10/2016 | Regev | |
| 2016/0315756 A1 | 10/2016 | Tenea et al. | |
| 2017/0041126 A1 | 2/2017 | Bergeron | |
| 2017/0085581 A1 | 3/2017 | Jackson | |

OTHER PUBLICATIONS

Spirent, "Precision Time Protocol (PTP) IEEE 1588," YouTube "alantalkstech", https://www.youtube.com/watch?v=yw-gd01aOYg, pp. 1-11 (Dec. 7, 2011).

Eidson, "IEEE-1588 Standard for a Precision Clock Synchronization Protocol for Networked Measurement and Control Systems—A Tutorial," Agilent Technologies, pp. 1-94 (Oct. 2005).

Notification of Transmittal of the International Search Report and the Written Opinion of the International Searching Authority, or the Declaration for International Application No. PCT/US2016/026534 (Jul. 8, 2016).

Notification of Transmittal of the International Search report and the Written Opinion of the International Searching Authority, or the Declaration for International Application No. PCT/US2016/026533 (Jul. 8, 2016).

Final Office Action for U.S. Appl. No. 13/933,661, filed Apr. 12, 2016.

Non-Final Office Action for U.S. Appl. No. 13/933,661, filed Dec. 14, 2015.

Commonly-assigned, co-pending U.S. Appl. No. 14/860,630 for "Methods, Systems, and Computer Readable Media for Detecting Physical Link Intrusions," (Unpublished, filed Sep. 21, 2015).

Commonly-assigned, co-pending U.S. Appl. No. 14/819,337 for "Modeling a Clock," (Unpublished, filed Aug. 5, 2015).

"Network Time Protocol," Wikipedia, https://en.wikipedia.org/wiki/Network_Time_Protocol, pp. 1-7 (Jul. 3, 2015).

Commonly-assigned, co-pending U.S. Appl. No. 14/685,552 for "Methods, Systems, and Computer Readable Media for One-Way Link Delay Measurement," (Unpublished, filed Apr. 13, 2015).

"High Density Modular Fiber Tap," Ixia, http://www.ixiacom.com/products/net-optics-flex-tap, pp. 1-4 (Jul. 2014).

"Ixia Anue 3500—Mobile Backhaul Testing Solution," Ixia Data Sheet, pp. 1-5 (Dec. 2013).

Arnold, "What Are All of These IEEE 1588 Clock Types," http://blog.meinbergglobal.com/2013/10/21/ieee1588clocktypes/, News and Tutorials from Meinberg, pp. 1-6 (Oct. 21, 2013).

"AN-1838 IEEE 1588 Boundary Clock and Transparent Clock Implementation Using the DP83640," Application Report, Texas Instruments, pp. 1-9 (Apr. 2013).

Non-Final Office Action for U.S. Appl. No. 14/860,630, filed Dec. 19, 2016.

Non-Final Office Action for U.S. Appl. No. 14/685,552, filed Oct. 20, 2016.

Non-Final Office Action for U.S. Appl. No. 13/933,661, filed Sep. 27, 2016.

Notification of Transmittal of the International Search Report and the Written Opinion of the International Searching Authority, or the Declaration for International Application No. PCT/US2016/040532 (Sep. 12, 2016).

Commonly-assigned, co-pending International Application No. PCT/US16/40532 for "Methods, Systems, and Computer Readable Media for Detecting Physical Link Intrusions," (Unpublished, filed Jun. 30, 2016).

Notice of Allowance and Fee(s) Due for U.S. Appl. No. 13/933,661 (Feb. 17, 2017).

Non-Final Office Action for U.S. Appl. No. 14/819,337 (Mar. 2, 2017).

Notice of Allowance and Fee(s) Due for U.S. Appl. No. 14/685,552 (Mar. 1, 2017).

* cited by examiner

METHODS, SYSTEMS, AND COMPUTER READABLE MEDIA FOR SYNCHRONIZING TIMING AMONG NETWORK INTERFACE CARDS (NICS) IN A NETWORK EQUIPMENT TEST DEVICE

TECHNICAL FIELD

The subject matter described herein relates to testing network devices. More particularly, the subject matter described herein relates to synchronizing timing among network interface cards in a network equipment test device.

BACKGROUND

In testing network communications devices, it is desirable to have a consistent clock source among network interfaces so that packet transmit and receipt times can be recorded consistently. For example, one type of test involves a test device sending the packets to a device under test and recording the packet transmission times. The device under test receives the packets, processes the packets, and returns the packets to the test device. The test device receives the packets and records the time of receipt of the packets. If the packet transmit times are generated consistently with the recorded times of receipt, then accurate packet timing statistics can be generated. However, if the packet transmit times are not generated consistently with the recording of the times of receipt, packet timing statistics will be inaccurate.

Figure 1:
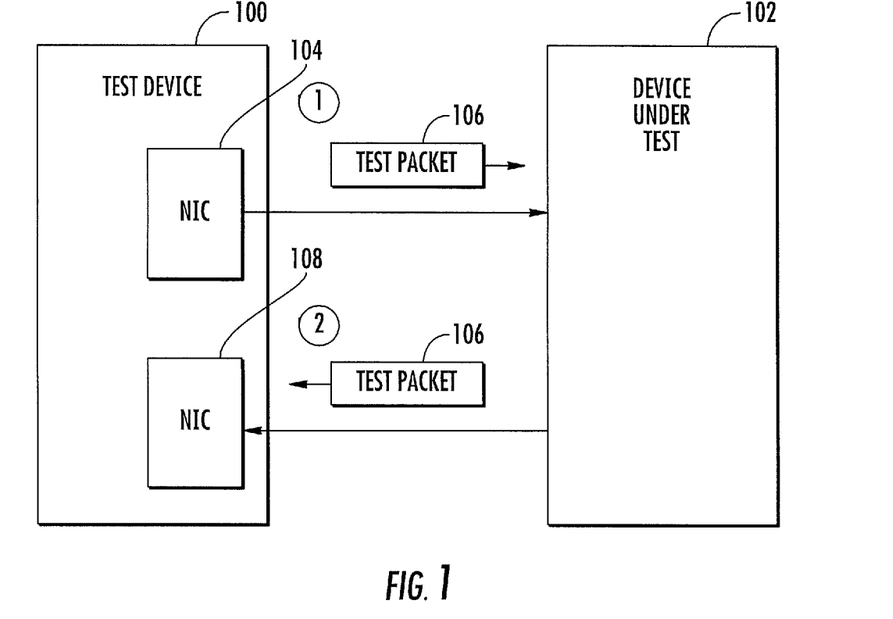
FIG. 1 is a block diagram illustrating the need for timing synchronization among network interface cards in a network equipment test device.

FIG. 1 illustrates an exemplary test device 100 and a device under test 102. In the illustrated example, a first network interface card (NIC) 104 of test device 100 transmits a packet 106 to device under test 102. Network interface card 104 records the time of transmission of packet 106 as T1. Device under test 102 processes and returns the packet 106. Packet 106 is received by network interface 108 of test device 100. Network interface 108 records the time T2 as the time of receipt of packet 106.

In order for test device 100 to make accurate measurements of jitter, latency, throughput, or other timing-related parameters, the time recorded by network interface 108 must be consistent with the time recorded by network interface card 104. In some applications, timing consistency on the order of microseconds or even nanoseconds may be required. Although a variety of solutions exist for synchronizing timing among different devices in a network, such solutions are typically not implemented between network interface cards because network interface cards include standard hardware and software and it is desirable to keep the costs of network interface cards low.

Accordingly, there exists a long felt need for methods, systems, and computer readable media for synchronizing timing among network interface cards in a network equipment test device.

SUMMARY

Methods, systems, and computer readable media for synchronizing timing among network interface cards in a network equipment test device are disclosed. One method includes generating and sending timing synchronization measurement signals to the management network interface card and a test network interface card in the network equipment test device. The method further includes recording times of receipt of the timing synchronization measurement signals at the management network interface card and the test network interface card. The method further includes adjusting timing of the test network interface card using the times of receipt of the timing synchronization measurement signals.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

As used herein, the term "message" refers to a packet, a frame, or other units of data, e.g., transferable in a communications network.

BRIEF DESCRIPTION OF THE DRAWINGS

The subject matter described herein will now be explained with reference to the accompanying drawings of which:

FIG. 7 is a flow chart illustrating an exemplary process for synchronization of timing among network interface cards in

DETAILED DESCRIPTION

Figure 2:
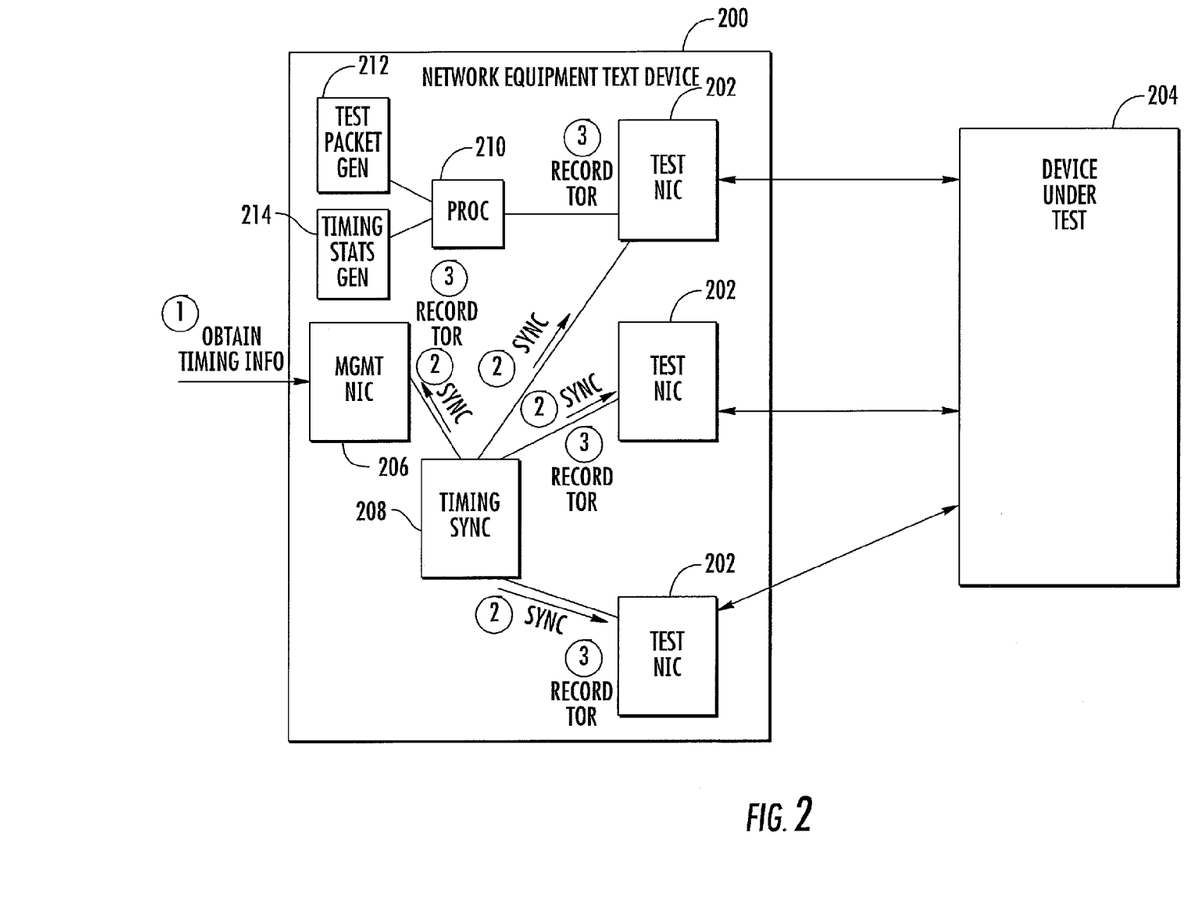
FIG. 2 is block diagram illustrating timing synchronization among network interface cards in a network equipment test device according to an embodiment of the subject matter described herein.

The subject matter described herein includes methods, systems, and computer readable media for synchronizing timing among network interface cards in a network equipment test device. FIG. 2 illustrates a network equipment test device and synchronization of timing among network interface cards in the network equipment test device according to an embodiment of the subject matter described herein. Referring to FIG. 2, a network equipment test device 200 includes a plurality of test network interface cards 202 that send test packets to and receive test packets from a device under test 204. Network equipment test device 200 may also include a management network interface card 206 for generating or obtaining timing information. In one embodiment, management network interface card 206 may obtain timing information from an external source, such as an IEEE 1588 master clock source. In an alternate embodiment, management network interface card 206 may generate its own accurate clock, for example, using a high precision local clock source. An example of how management network interface card 206 may obtain timing information from an external clock source will be described in detail below.

Network equipment test device 200 further includes a timing synchronizer 208 for synchronizing timing between management network interface card 206 and test network interface cards 202. In one embodiment, timing synchronizer 208 generates and sends timing synchronization measurement signals to management network interface card 206 and test network interface cards 202. Management network interface card 206 and test network interface cards 202 each record the time of receipt of the timing synchronization measurement signals. The times of receipt can be used to generate a clock frequency adjustment factor and an offset between the timing obtained by management network interface card 206 and test network interface cards 202. An example calculation of the clock frequency adjustment factor and offset will now be provided.

Suppose management network interface card 206 obtains a time of day T1 from and a clock frequency of F1 from an external timing source. To determine the clock frequency adjustment factor, timing synchronizer 208 sends timing synchronization measurement signals at the same time to management network interface card 206 and to test network interface cards 202. Management network interface card 206 records the time of receipt of the timing synchronization measurement signal. Each test network interface card 202 also records its time of receipt of the timing synchronization measurement signal. Timing synchronizer 208 may repeat the process by sending another timing synchronization measurement signal, and management network interface card 206 and test network interface cards 202 may record the times of receipt. If at least two times of receipt are recorded, there is enough information to compute the frequency adjustment factor and the offset. For example, if a given test network interface card 202 records successive times of receipt $T_{test1}$ and $T_{test2}$ and management card 206 records corresponding successive times of receipt $T_{mgmt1}$ and $T_{mgmt2}$, the frequency adjustment factor can be calculated as follows:

$$\text{Freq\_Adj\_Factor} = \frac{(T_{test2} - T_{test1})}{(T_{mgmt2} - T_{mgmt1})} \quad (1)$$

Assuming a linear relationship between the clock obtained by management network interface card 206 and the clocks of test interface cards 202, the following equation can be used to determine any offset between the test network interface card clock and the management card clock.

$$\text{Clock\_Test\_Int} = \text{Freq\_Adj\_Factor}(\text{Clock\_Mgmt\_Int}) + \text{Offset} \quad (2)$$

In Equation 2, Clock_Test_Int is the measured clock value of the test network interface, Clock_Mgmt_Int is the measured clock value of the management interface, and offset is the offset value between the two clocks. The measured clock values $T_{test1}$, $T_{test2}$, $T_{mgmt1}$ and $T_{mgmt2}$ referenced above with respect to Equation 1 can also be used to calculate the frequency adjustment factor and offset. For example, if $T_{test1}=2$, $T_{test2}=4$, $T_{mgmt1}=1$ and $T_{mgmt2}=2$, the frequency adjustment factor can be calculated as follows:

$$\begin{aligned}\text{Freq\_Adj\_Factor} &= \frac{(T_{test2} - T_{test1})}{(T_{mgmt2} - T_{mgmt1})} \\ &= \frac{(4-2)}{(2-1)} \\ &= 2\end{aligned}$$

The offset can then be calculated as follows:

Clock_Test_Int=Freq_Adj_Factor(Clock_Mgmt_Int)+ Offset $(T_{test1})=(2)(T_{mgmt1})+\text{Offset}$ $(2)=(2)(1)+\text{Offset}$ $(2)=2+\text{Offset}$ Offset=0

Now that the frequency adjustment factor and offset between the test network interface card and the management network interface card are known, the test network interface card can adjust its clock to be equal to the current clock of the management network interface and using a re-arranged version of Equation 2 with the management network interface clock value being the unknown.

$$\text{Clock\_Mgmt\_Int} = \left(\frac{1}{\text{Freq\_Adj\_Factor}}\right) * ((\text{Clock\_Test\_Int}) - \text{Offset}) \quad (3)$$

Changing the name of the variable Clock_Mgmt_Int in Equation 3 to Desired_Tst_Clk_Val, the equation for the desired clock value on the test network interface card becomes:

$$\text{Desired\_Tst\_Clk\_Val} = \quad (4)$$
$$\left(\frac{1}{\text{Freq\_Adj\_Factor}}\right) * ((\text{Clock\_Test\_Int}) - \text{Offset})$$

Thus, continuing with the example above, if the current value of the test network interface card clock is 3, then the adjusted or desired clock value can be calculated using Equation 4 as follows:

$$\begin{aligned}\text{Desired\_Tst\_Clk\_Value} &= \left(\frac{1}{2}\right) * ((3) - 0) \\ &= 1.5\end{aligned}$$

Figure 3:
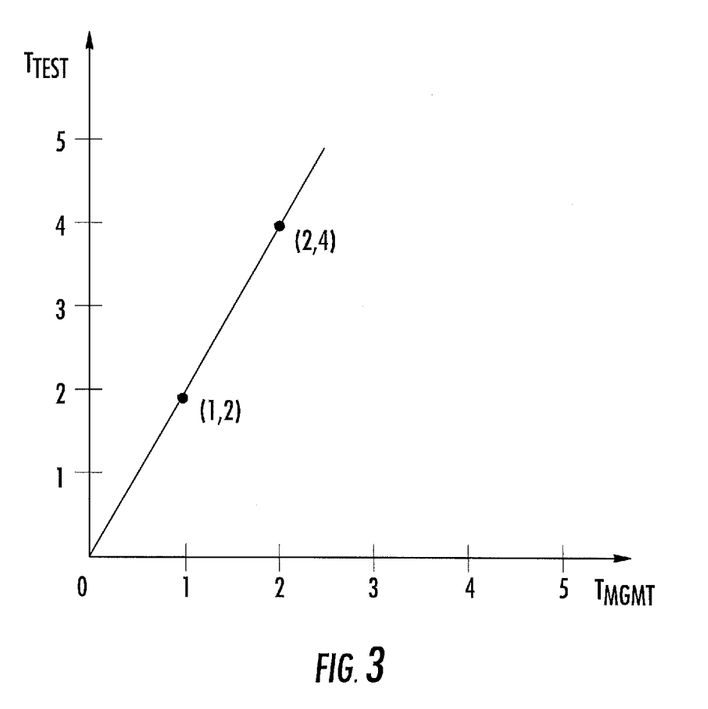
FIG. 3 is a graph illustrating a relationship between clock values on a test network interface card with respect to clock values on a management network interface card usable to synchronize timing among the test and management network interface cards according to an embodiment of the subject matter described herein.

FIG. 3 graphically illustrates the relationship between the test network interface values and the management network interface values for the present example. In FIG. 3, the horizontal axis represents the measured times of receipt of the synchronization measurement signals by the management network interface card using the local clock of the management network interface card, and the vertical axis represents the measured times of receipt of the synchronization measurement signals using the clock of the test network interface card. From the example above, the two ordered pairs of clock values are $(T_{test1}, T_{mgmt1})=(1,2)$ and $(T_{test2}, T_{mgmt2})=(2,4)$. These values are plotted on the graph. The line through test points illustrates the relationship of the frequency of the test network interface clock and the management network interface clock. The slope of the line is equal to the frequency adjustment factor. The point where the line intersects the vertical axis is the offset between the clock of the test network interface card and the management network interface card. The offset is zero in this case.

The process of computing the frequency adjustment factor and the offset may be performed for each test network interface card 202 in network equipment test device 200. Once the calculation of these values is performed by each test network interface card 202, each test network interface card 202 may generate and send test packets to device under test 204. Because the clocks of each test network interface card 202 are synchronized with the clock of management network interface 206, transmit and receipt times can be consistently recorded among test network interface cards 202. The consistent recording of packet transmit and receipt times can be used to compute packet timing statistics, such as latency, jitter, throughput, average uplink or downlink bandwidth, etc. The synchronization between the clocks of test network interface cards 202 and management network interface card 206 may be performed on a continual or periodic basis to maintain synchronization between the clocks.

Although the example illustrated in FIG. 3 assumes a linear relationship between the clock of management network interface card 206 and test network interface cards 202, the subject matter described herein is not limited to a linear relationship between the clocks. The times of receipt of the timing synchronization measurement signals may be recorded and the relationship between the clocks may be fitted to any suitable linear or non-linear curve or model curve using a curve fitting algorithm, such as least squares approximation.

Figure 4:
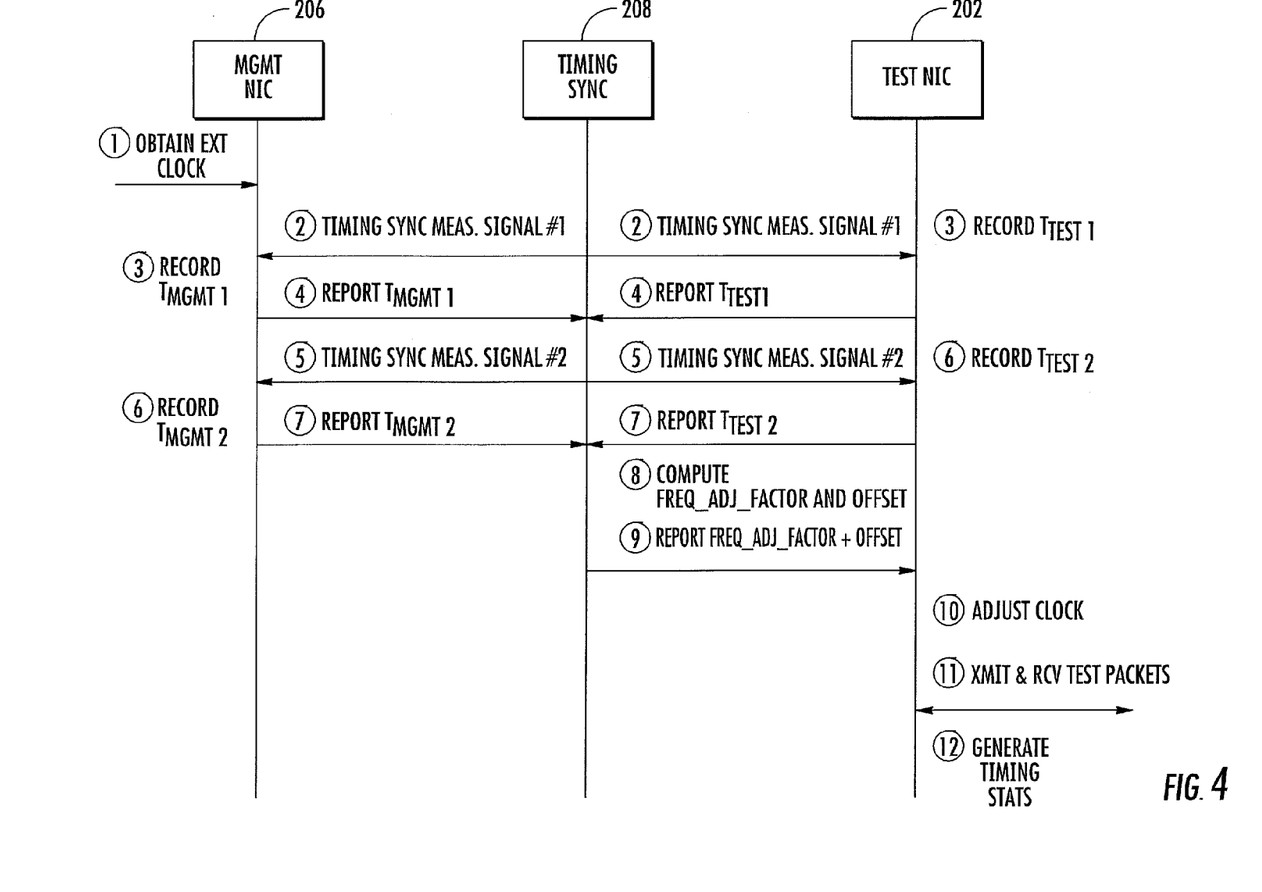
FIG. 4 is a message flow diagram illustrating synchronization of timing among network interface cards in a network equipment test device according to an embodiment of the subject matter described herein.

FIG. 4 is a message flow diagram illustrating in more detail the synchronization of clocks between a test NIC 202 and management NIC 206 according to an embodiment of the subject matter described herein. Referring to FIG. 4, in step 1, management NIC 206 receives a clock from an external source. The clock may be an IEEE 1588 clock or other accurate timing source. In another example, the clock may be generated internally. In step 2, timing synchronizer 208 generates and sends timing synchronization measurement signal #1 to management NIC 206 and test NIC 202. The timing synchronization measurement signal sent to NIC may be transmitted over a bus, such as a PCI bus. The signal may be an electrical pulse, a PCIe register write, or other mechanism. It is assumed that the transmission to management NIC 206 and test NIC 202 occurs simultaneously. It is also assumed that the time for the timing synchronization measurement signal to reach management NIC 206 and test NIC 202 is small such that any error caused by differences in signal propagation time is also small relative to the desired precision and can be ignored. In step 3, management NIC 206 and test NIC 202 record the time of receipt of the timing synchronization measurement packet. In step 4, management NIC 206 and test NIC 202 report their respective times of receipt of the timing synchronization measurement packet to timing synchronizer 208.

In step 5, timing synchronizer 208 sends timing synchronization measurement signal #2 to management NIC 206 and test NIC 202. In step 6, management NIC 206 and test NIC 202 record their respective times of receipt of the second timing synchronization measurement signal. In step 7, management NIC 206 and test NIC 202 report their respective times of receipt of the second timing synchronization measurement signal to timing synchronizer 208.

In step 8, timing synchronizer 208 computes the frequency adjustment factor and the offset from the times of receipt reported by management NIC 206 and test NIC 202. The computation may be performed using Equations 1 and 2 above. In step 9, timing synchronizer 208 reports the frequency adjustment factor and the offset to test NIC 202. In step 10, test NIC 202 adjusts its clock based on the frequency adjustment factor and offset. Adjusting the clock may simply include computing desired test clock values using Equation 4 and the local clock of test NIC 202. In step 11, test NIC 202 generates and sends test packets to the device under test, receives test packets from the device under test, and uses the adjusted clock to accurately record timing. In step 12, the test NIC or a separate entity within or external to network equipment test device generates packet timing statistics for the test. As stated above, the timing statistics or measurements may include latency, jitter, throughput, uplink or downlink bandwidth, etc.

Figure 5:
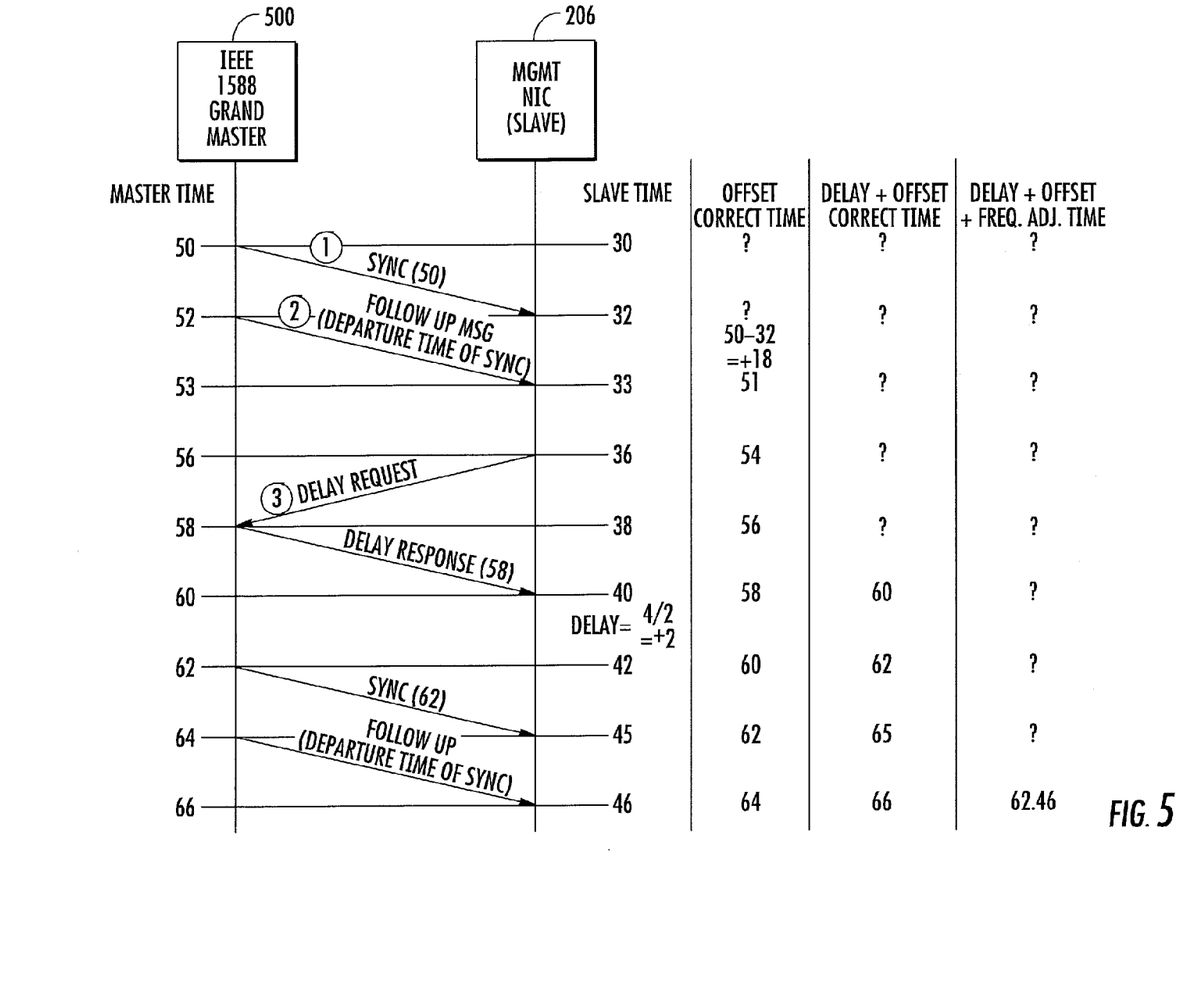
FIG. 5 is a message flow diagram illustrating obtaining of timing information by a management network interface card in a network equipment test device according to an embodiment of the subject matter described herein.

As stated above, management NIC 206 may obtain its clock value from an external source. FIG. 5 is a message flow diagram illustrating one method by which management NIC 206 may obtain its clock value. Referring to FIG. 5, management NIC 206 communicates with an IEEE 1588 grand master node 500. An IEEE 1588 grand master is a clock source in a network that has been elected by other sources in the network as the most precise clock in the network. All other clock sources in the network synchronize with the IEEE 1588 grand master and are referred to as slaves. In the illustrated example, management NIC 206 is assumed to be a slave. Referring to the message flow, in line 1, the IEEE 1588 grand master sends a sync message to management NIC 206. In line 2, the IEEE 1588 grand master sends a follow-up message that includes a hardware time stamp corresponding to the precise departure time of the sync. In the illustrated example, it is assumed that the departure time of the sync is 50, recorded in master clock time. Once management NIC 206 receives the follow-up message, management NIC can compute the offset corrected time. In the illustrated example, management NIC receives the sync signal at time 32 in slave time. The departure time of the sync signal recorded in master time is 50. Accordingly, management NIC 206 computes the offset between the master and slave clock as +18. At this point, management NIC 206 knows the offset corrected time but has not yet accounted for network delay.

In order to account for network delay, management NIC 206 sends a delay request message to grand master 500. Grand master 500 returns a delay response. Management NIC computes the roundtrip time for the delay request and the delay response, which in the illustrated example is 4 seconds. Management NIC 206 assumes that the network delay is symmetric and therefore computes that the one way delay is +2. Once the one way network delay is computed, management NIC 206 can compute the delay and offset corrected time. Because the offset is 18 and the network delay is +2, at time 40, the slave computes the delay and offset corrected time to be 60.

In addition to calculating the delay and offset between the master and slave clocks, the management NIC may also determine the frequency adjustment factor between the master and slave clocks. The frequency adjustment factor can be determined by grand master 500 transmitting sync and follow up messages to management NIC 204. In the example illustrated in FIG. 5, the master transmits the second sync at master time 62 and it is received by the slave at slave time 45. The frequency adjustment factor can then be computed using the transmission time and time of receipt of the first sync, the transmission time and the time of receipt of the second sync, and equation 1. Plugging the data into Equation 1, the frequency adjustment factor is as follows:

$$\text{Freq\_Adj\_Factor} = \frac{(T_{sync2\_master} - T_{sync1\_master})}{(T_{sync2\_slave} - T_{sync1\_slave})}$$

$$= \frac{(62-50)}{(45-32)}$$

$$= 0.9230769$$

In the above-listed equation, the variables $T_{sync1\_master}$ and $T_{sync2\_master}$ are the transmission times of the first and second sync packets recorded in the master's local clock time. The variables $T_{sync1\ slave}$ and $T_{sync2\ slave}$ are the receipt times of the first and second sync packets recorded in the slave's local clock time. Once the frequency adjustment factor, the delay, and the offset are known, the delay, offset, and frequency adjusted time at the slave NIC can be calculated using the equation as follows:

$$\text{Clock\_Slave\_Adj} = \text{Freq\_Adj\_Factor}(\text{Clock\_Slave\_Unadj}) + \text{Offset}$$

$$\text{Clock\_Slave\_Adj} = 0.9230769(46) + 20$$

$$= 62.46$$

In the above-listed equation, Clock_Slave_Adj is the frequency, offset, and delay adjusted value of the slave clock. Clock_Slave_Unadj is the unadjusted slave clock value for which it is desirable to compute an adjusted slave clock value. Freq_Adj_Factor is the frequency adjustment factor computed above. Offset is the total offset accounting for both network delay and initial phase offset between the master and slave clocks. The value for the frequency adjustment factor is 0.92307, computed as shown in the preceding paragraph. From FIG. 5, the value of the slave clock at the time of receipt of the second follow up signal is 46. The offset is 18+2=20. The value 62.46 represents the frequency, delay, and phase offset corrected time when the unadjusted slave time is 46. The calculation of the frequency adjustment factor the propagation delay, and the phase offset may be repeated periodically so that management NIC 206 maintains its synchronization with IEEE 1588 grand master 500.

Thus, using IEEE 1588, management NIC 206 may obtain a precise time source, which may be distributed among the test NICs using the mechanism described above. However, the subject matter described herein is not limited to using IEEE 1588 to obtain the precise time value at the management NIC. In another example, the management NIC may include its own precise internal clock source or may obtain the precise time from an external source, such as GPS.

Using the synchronization protocols described herein, a plurality of network equipment test devices may be synchronized through a common timing source and may record consistent time when testing one or more devices under test.

Figure 6:
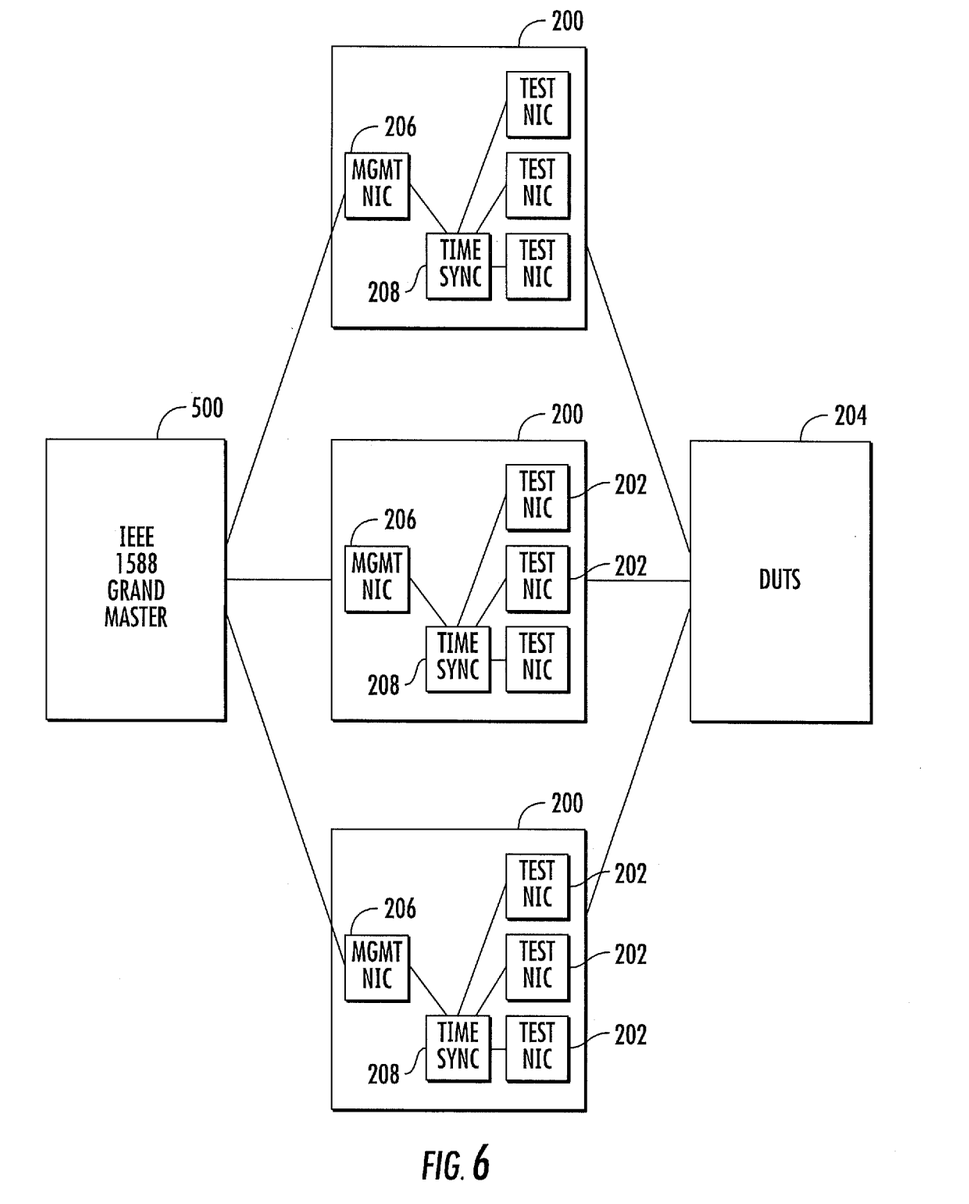
FIG. 6 is a block diagram illustrating synchronization of timing among network interface cards in a plurality of network equipment test devices according to an embodiment of the subject matter described herein.

FIG. 6 illustrates such a scenario. In FIG. 6, management NICs 206 of a plurality of network equipment test devices 200 are synchronized to an IEEE 1588 grand master 500. Within each network equipment test device, test NICs 202 are synchronized to management NIC 206 by timing synchronizer 208 using the protocols described above. As a result, when test NICs 202 transmit packets to devices under test 204, the transmit times and receipt times of the packets will be consistently recorded, even when the NICs are on different devices under test and do not communicate with each other using external timing synchronization protocols.

Thus, the subject matter described herein improves the technological area of network equipment testing by providing an elegant solution to synchronizing timing between network interface cards in a network equipment test device. Such a solution may be tied to a particular machine or apparatus, such as a network equipment test device. It is understood that a network equipment test device may include a processor for executing the timing synchronizer described above and that each network interface card may include hardware for implementing network protocol stacks. It is also understood that a network equipment test device may include a packet generator executed by its processor to transmit test packets and to and receive test packets from a device under test. The network equipment test device may further include a packet statistics generator that generates packet timing measurements, including any of the measurements described herein.

Figure 7:
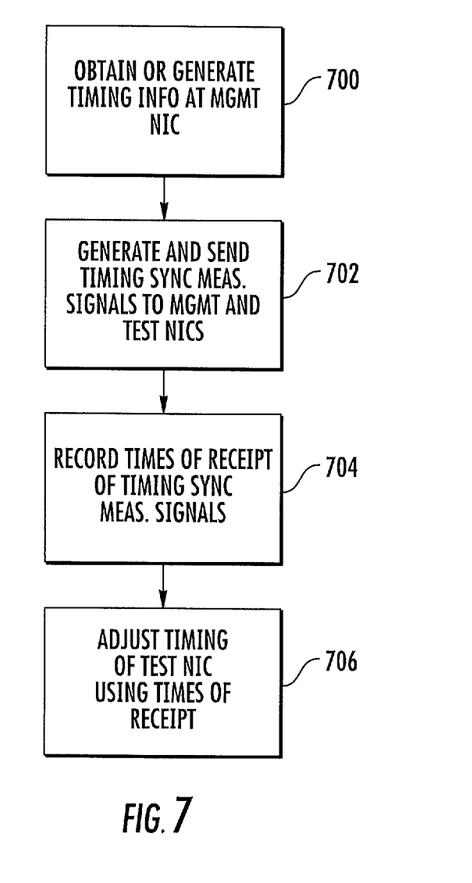

FIG. 7 is a flow chart illustrating an exemplary process for synchronizing timing among network interface cards in a network equipment test device according to an embodiment of the subject matter described herein. Referring to FIG. 7, in step 700, the network equipment test device obtains or generates timing information at a management NIC. For example, management NIC 206 may obtain timing information from an external source of may generate its own internal timing information. In step 702, timing synchronization measurement signals are sent to the management NIC and the test NIC. For example, timing synchronizer 208 may send the signals to management NIC 206 and to test NICs 202.

In step 704, times of receipt of the timing sync signals are recorded. For example, each test NIC 202 and management NIC 206 may record time of receipt of the timing synchronization measurement signals.

In step 706, timing of the test NIC is adjusted using the times of receipt. For example, timing synchronizer 208 may compute the frequency adjustment factor and offset using the mechanism described above. Timing synchronizer 208 may then send these parameters to the test NIC. The test NIC may utilize these parameters to adjust recorded times of receipt of packets, transmits times of packets, and time stamps inserted in packets. Each test NIC 202 may use the synchronized timing to generate consistent packet timing measurements.

As stated above, one packet timing measurement that may be generated by test device 100 is packet latency. Latency is a measure of the amount of time required to process and/or transmit a packet. In one example, test device 200 may measure packet latency by timestamping a packet at a test NIC 202 and transmitting the packet to device under test 204. Device under test 204 may return the packet to test device 200, where the packet is received by another test NIC 202. The packet may include the original timestamp inserted by the transmitting test NIC 202. The receiving test NIC 202 may record the time of receipt using its local clock, which may be synchronized with the clock of the same management NIC 206 as the transmitting test NIC 202, as described above. Returning to FIG. 2, test device 200 may include a processor 210, a test packet generator 212 and a timing statistics generator 214. Processor 210 may be a microprocessor that executes tests, such as stress tests and performances tests to test device under test 204. Test packet generator 212 may generate test packets to be transmitted to device under test 204 during each of the tests. Timing statistics generator 214 may generate packet statistics based on packets transmitted to and received from device under test 204.

In one example, timing statistics generator 214 may compute the total processing and transmit latency of the packet by subtracting the transmit timestamp value in the packet from the time of receipt. Timing statistics generator 214 may compute packet jitter by calculating latencies for a plurality of packets and then computing jitter as the average difference in latency calculated for the plurality of packets. Timing statistics generator 214 may compute throughput by recording the number of packets transmitted and processed during a time interval multiplied by the size of the packets and divided by the time interval. Timing statistics generator 214 may compute other statistics without departing from the scope of the subject matter described herein.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for synchronizing timing among network interface cards in a network equipment test device, the method comprising:
   at a management network interface card in a network equipment test device, obtaining or generating timing information;
   from a timing synchronizer in the network equipment test device, generating and sending timing synchronization measurement signals to the management network interface card and a test network interface card in the network equipment test device;
   recording times of receipt of the timing synchronization measurement signals at the management network interface card and the test network interface card;
   communicating the times of receipt of the timing synchronization measurement signals to the timing synchronizer;
   at the timing synchronizer, computing, based on the times of receipt, timing adjustment information and communicating the timing adjustment information to the test network interface card; and
   adjusting timing of the test network interface card using the timing adjustment information.

2. The method of claim 1 wherein obtaining or generating timing information includes obtaining timing information from a source external to the network equipment test device.

3. The method of claim 2 wherein obtaining the timing information from an external source includes obtaining a time of day and a clock frequency from an IEEE 1588 master clock source.

4. The method of claim 1 wherein computing the timing adjustment information includes computing a clock frequency adjustment factor for adjusting a clock frequency of the test network interface card to match a clock frequency of the management network interface card.

5. The method of claim 4 wherein recording times of receipt of the synchronization measurement signals includes recording times $T_{test1}$ and $T_{test2}$ at the test network interface card and recording times $T_{mgmt2}$ and $T_{mgmt1}$ at the management network interface card and wherein computing the clock frequency adjustment factor includes computing the clock frequency adjustment factor as $(T_{test2}-T_{test1})/(T_{mgmt2}-T_{mgmt1})$.

6. The method of claim 1 comprising, at the test network interface card, using the adjusted timing to generate timestamps, inserting the timestamps into packets, and transmitting the packets to a device under test.

7. The method of claim 6 comprising, at another test network interface card, receiving the packets from the device under test and using the timing obtained from the management network interface card to record a time of receipt of each packet.

8. The method of claim 7 comprising generating packet timing statistics based on the recorded times of receipt and the timestamps in each packet.

9. The method of claim 8 wherein generating the packet timing statistics includes generating statistical measures of at least one of: packet latency, packet jitter, and packet throughput.

10. The method of claim 1 comprising using timing from the master network interface card to adjust timing of a plurality of test network interface cards.

11. A system for synchronizing timing among network interface cards in a network equipment test device, the system comprising:
   a network equipment test device including:
      a test network interface card for sending test packets to a device under test;
      a management network interface card for obtaining or generating timing information;
      a timing synchronizer for generating and sending timing synchronization measurement signals to the management network interface card and the test network interface card;
      wherein the management network interface card and the test network interface card record times of receipt of the timing synchronization measurement signals and communicate the times of receipt to the timing synchronizer; and
      wherein the timing synchronizer computes timing adjustment information using the times of receipt of the timing synchronization measurement signals and communicates the timing adjustment information to the test network interface card and wherein the test network interface card adjusts its timing using the timing adjustment information.

12. The system of claim 11 wherein the management network interface card is configured to obtain timing information from a source external to the network equipment test device.

13. The system of claim 12 wherein the management network interface card is configured to obtain a time of day and a clock frequency from an IEEE 1588 master clock source.

14. The system of claim 11 wherein the timing adjustment information includes a clock frequency adjustment factor for adjusting a clock frequency of the test network interface card to match a clock frequency of the management network interface card.

15. The system of claim 14 wherein the times of receipt recorded by the test network interface card include times $T_{test1}$ and $T_{test2}$, wherein the times of receipt recorded by the management network interface card include times $T_{mgmt2}$ and $T_{mgmt1}$, and wherein the timing synchronizer is configured to calculate the clock frequency adjustment factor as $(T_{test2}-T_{test1})/(T_{mgmt2}-T_{mgmt1})$.

16. The system of claim 11 wherein the test network interface card is configured to use the adjusted timing to generate timestamps, insert the timestamps into packets, and transmit the packets to a device under test.

17. The system of claim 16 comprising a second test network interface card configured to receive the packets from the device under test and use the timing obtained from the management network interface card to record a time of receipt of each packet.

18. The system of claim 17 comprising a timing statistics generator for generating packet timing statistics based on the recorded times of receipt and the timestamps in each packet.

19. The system of claim 18 wherein the timing statistics generator is configured to generate generating statistical measures of at least one of: packet latency, packet jitter, and packet throughput.

20. The system of claim 11 wherein the network equipment test device is configured to use timing from the master network interface card to adjust timing of a plurality of test network interface cards.

21. A non-transitory computer readable medium comprising computer executable instructions embodied in the computer readable medium that when executed by a processor of a computer control the computer to perform steps comprising:
 at a management network interface card in a network equipment test device, generating or obtaining timing information;
 from a timing synchronizer in the network equipment test device, generating and sending timing synchronization measurement signals to the management network interface card and a test network interface card in the network equipment test device;
 recording times of receipt of the timing synchronization measurement signals at the management network interface card and the test network interface card;
 communicating the times of receipt of the timing synchronization measurement signals to the timing synchronizer;
 at the timing synchronizer, computing, based on the times of receipt, timing adjustment information and communicating the timing adjustment information to the test network interface card; and
 adjusting timing of the test network interface card using the timing adjustment information.

* * * * *